United States Patent
Kitaori et al.

(10) Patent No.: US 10,020,770 B2
(45) Date of Patent: Jul. 10, 2018

(54) VEHICLE

(71) Applicant: HONDA MOTOR CO., LTD., Tokyo (JP)

(72) Inventors: Ken Kitaori, Wako (JP); Masanari Fukuchi, Wako (JP); Yoshihiro Ito, Wako (JP); Satoshi Matsui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/847,914

(22) Filed: Dec. 20, 2017

(65) Prior Publication Data

US 2018/0115272 A1 Apr. 26, 2018

Related U.S. Application Data

(63) Continuation of application No. 15/447,129, filed on Mar. 2, 2017, now Pat. No. 9,887,663.

(30) Foreign Application Priority Data

Mar. 4, 2016 (JP) .................................. 2016-041934

(51) Int. Cl.
*G05D 23/00* (2006.01)
*H02P 29/60* (2016.01)
(Continued)

(52) U.S. Cl.
CPC ................ *H02P 29/60* (2016.02); *B60L 7/14* (2013.01); *B60L 11/08* (2013.01); *B60L 11/123* (2013.01);
(Continued)

(58) Field of Classification Search
CPC ........ G05D 23/00; G05D 23/02; G05D 23/13; G05D 23/19; G05D 23/20; G05D 23/22;
(Continued)

(56) References Cited

U.S. PATENT DOCUMENTS 7,495,411 B2 * 2/2009 Kaneko ................. B60L 11/123
180/65.1
8,305,018 B2 * 11/2012 Okamura ............... B60K 6/445
318/370
(Continued)

FOREIGN PATENT DOCUMENTS

JP 2003-134602 5/2003
JP 4561616 B2 6/2007
(Continued)

OTHER PUBLICATIONS

Japanese Office Action for corresponding JP Application No. 2016-041934, dated Jan. 9, 2018 (w/ English machine translation).

*Primary Examiner* — Antony M Paul
(74) *Attorney, Agent, or Firm* — Mori & Ward, LLP

(57) ABSTRACT

A vehicle includes an energy storage, a motor driver, an electric motor, and circuitry. The motor driver is configured to convert direct-current power to alternating-current power and to convert alternating-current power to direct-current power. The electric motor is connected to the energy storage via the motor driver to move the vehicle. The circuitry is configured to drive the electric motor with a first current value to consume excess electric power. The first current value is different from a minimum current value to generate regeneration power arising from a braking force. The circuitry is configured to drive the electric motor with a second current value smaller than the first current value if a temperature of the electric motor is higher than a first threshold temperature or a temperature of the motor driver is higher than a second threshold temperature.

8 Claims, 15 Drawing Sheets

(51) Int. Cl.
*B60L 7/14* (2006.01)
*B60L 11/08* (2006.01)
*B60L 11/12* (2006.01)
*B60L 11/14* (2006.01)
*B60L 15/02* (2006.01)
*H02P 27/06* (2006.01)
*B60W 20/14* (2016.01)
*B60K 6/442* (2007.10)

(52) U.S. Cl.
CPC ............... *B60L 11/14* (2013.01); *B60L 15/02* (2013.01); *B60W 20/14* (2016.01); *H02P 27/06* (2013.01); *B60K 6/442* (2013.01); *B60L 2240/545* (2013.01); *B60L 2240/547* (2013.01); *B60L 2240/549* (2013.01); *B60W 2510/087* (2013.01); *B60W 2510/244* (2013.01); *B60Y 2200/92* (2013.01); *Y10S 903/93* (2013.01); *Y10S 903/947* (2013.01)

(58) Field of Classification Search
CPC ........ G05D 23/24; G05D 23/36; G05D 23/27; G05D 23/275; G05D 23/30; G05D 23/32; G05B 5/00; H02P 27/04; H02P 27/06; H02P 29/60
USPC ....... 318/471, 472, 473, 782, 783, 800, 801, 318/799, 362, 400.01, 400.02, 400.14, 318/400.15, 700, 701, 727, 374, 375, 376; 361/25, 27, 30; 363/40, 44, 95
See application file for complete search history.

(56) References Cited

U.S. PATENT DOCUMENTS

| | | | |
|---|---|---|---|
| 8,639,404 B2* | 1/2014 | Sugiyama | B60K 6/12 |
| | | | 701/22 |
| 9,120,482 B2* | 9/2015 | Kobayashi | B60K 6/48 |
| 2009/0243522 A1 | 10/2009 | Suhama et al. | |
| 2012/0249024 A1 | 10/2012 | Saha et al. | |
| 2014/0180517 A1 | 6/2014 | Endo | |
| 2015/0120120 A1 | 4/2015 | Ota | |
| 2016/0059843 A1 | 3/2016 | Oguma et al. | |

FOREIGN PATENT DOCUMENTS

| | | |
|---|---|---|
| JP | 2007-230298 | 9/2007 |
| JP | 5200797 B2 | 3/2010 |
| JP | 5200991 B2 | 9/2010 |
| JP | 5534323 B2 | 10/2011 |
| JP | 5510116 B2 | 1/2012 |
| JP | 2012-213253 | 11/2012 |
| JP | 5652659 B2 | 11/2012 |
| JP | 5762092 B2 | 11/2012 |
| JP | 2014-50195 | 3/2014 |
| JP | 5712999 B2 | 7/2014 |
| JP | 2014-233194 | 12/2014 |
| JP | 5942958 B2 | 5/2015 |
| JP | 2015-113045 | 6/2015 |
| JP | 2016-049837 | 4/2016 |
| JP | 2017-077808 | 4/2017 |
| WO | WO2013/0168530 | 11/2013 |

* cited by examiner

VEHICLE

CROSS-REFERENCES TO RELATED APPLICATIONS

The present application is a continuation application of U.S. patent application Ser. No. 15/447,129 filed on Mar. 2, 2017, which claims priority under 35 U.S.C. § 119 to Japanese Patent Application No. 2016-041934, filed Mar. 4, 2016, entitled "Vehicle." The contents of these applications are incorporated herein by reference in their entirety.

BACKGROUND

1. Field

The present disclosure relates to a vehicle.

2. Description of the Related Art

A hybrid vehicle described in Japanese Unexamined Patent Application Publication No. 2003-134602 includes an engine, a generation electric motor driven by the engine, a drive electric motor, and a battery acting as an energy store for electric energy (see FIG. 1 of Japanese Unexamined Patent Application Publication No. 2003-134602).

In the hybrid vehicle described in Japanese Unexamined Patent Application Publication No. 2003-134602, in addition to braking control to reduce the speed of a vehicle by controlling a braking device based on the operation amount of a brake pedal and a deceleration request command from a vehicle speed control unit, regenerative cooperative braking is also performed to add, as braking force, regenerative torque from the drive electric motor.

In the hybrid vehicle described in Japanese Unexamined Patent Application Publication No. 2003-134602, in a regeneration mode of the drive electric motor, regenerative energy generated by the drive electric motor in the regeneration mode is stored as electric energy in the battery. Control is described therein for cases in which the desired deceleration is not obtainable because the battery is unable to absorb the regenerative energy of the drive electric motor due to the state of charge of the battery. In such cases, the generation electric motor is controlled so that the q-axis current is 0, the d-axis current<0, and regenerative energy from the drive electric motor unable to be absorbed by the battery is lost as heat in the generation electric motor, the desired deceleration is obtained by absorbing the excess electric energy (see Japanese Unexamined Patent Application Publication No. 2003-134602 paragraph [0019], FIG. 3A, and FIG. 3B).

SUMMARY

According to one aspect of the present invention, a vehicle includes an energy storage, a motor driver, an electric motor, and circuitry. The motor driver is configured to convert direct-current power to alternating-current power and to convert alternating-current power to direct-current power. The electric motor is connected to the energy storage via the motor driver to move the vehicle. The circuitry is configured to drive the electric motor with a first current value to consume excess electric power. The first current value is different from a minimum current value to generate regeneration power arising from a braking force. The circuitry is configured to drive the electric motor with a second current value smaller than the first current value if a temperature of the electric motor is higher than a first threshold temperature or a temperature of the motor driver is higher than a second threshold temperature.

According to another aspect of the present invention, a vehicle includes an energy storage, a motor driver, an electric motor, and circuitry. The motor driver is configured to convert direct-current power to alternating-current power and to convert alternating-current power to direct-current power. The electric motor is connected to the energy storage via the motor driver to move the vehicle. The circuitry is configured to drive the electric motor with a first current value to consume excess electric power. The first current value is different from a minimum current value to generate a driving force. The circuitry is configured to drive the electric motor with a second current value smaller than the first current value if a temperature of the electric motor is higher than a first threshold temperature or a temperature of the motor driver is higher than a second threshold temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
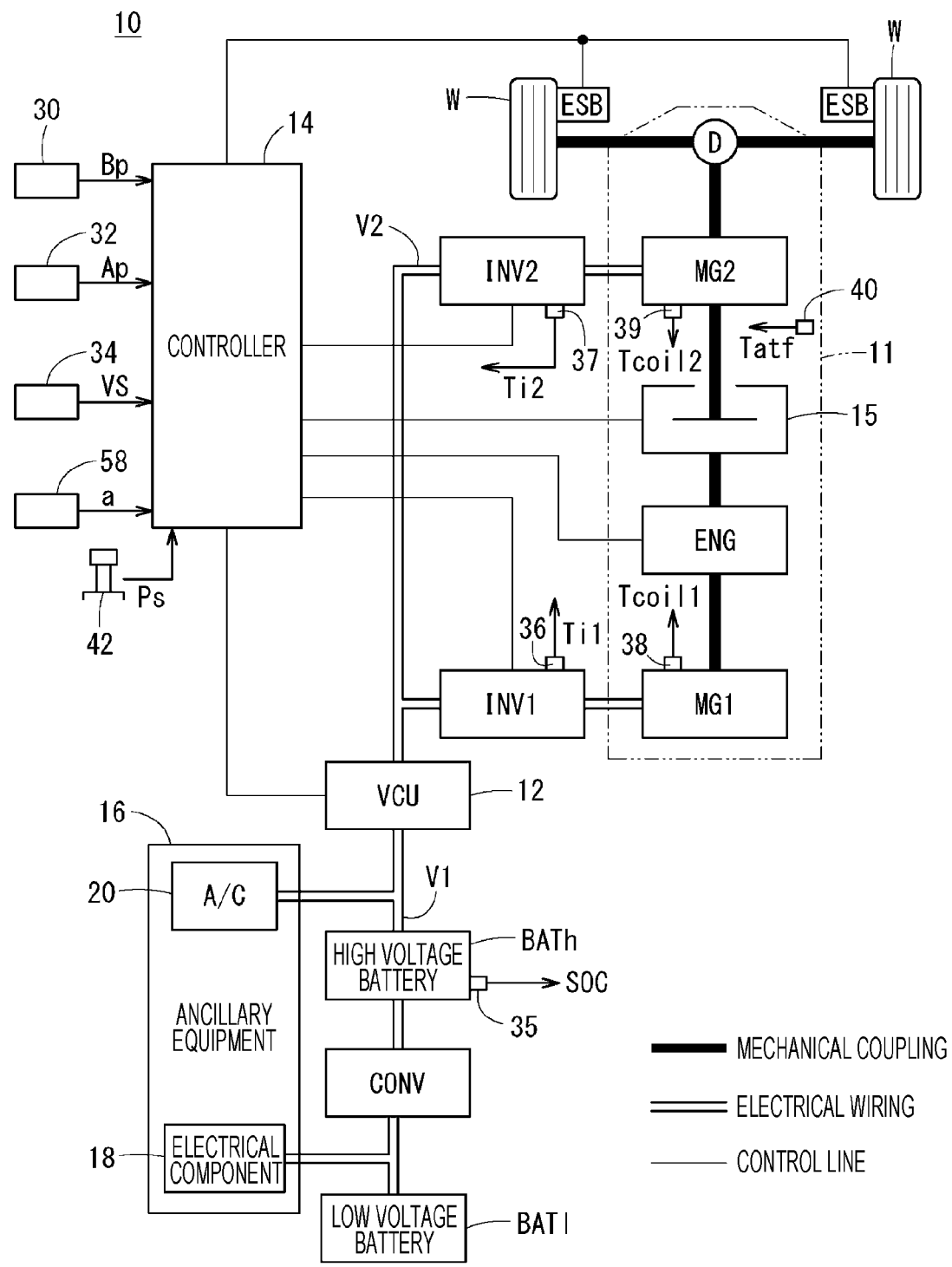
FIG. 1 is a block diagram illustrating a schematic configuration of a vehicle according to an embodiment.

The embodiment(s) will now be described with reference to the accompanying drawings, wherein like reference numerals designate corresponding or identical elements throughout the various drawings.

Detailed explanation follows regarding preferable embodiments of a vehicle according to the present disclosure, with reference to the accompanying drawings.

Configuration

FIG. 1 is a block diagram illustrating a schematic configuration of a vehicle (also called a car) 10 according to an embodiment.

The vehicle 10 basically includes an engine ENG, a drive system 11, a high voltage battery BATh, a low voltage battery BAT1, a voltage control unit (VCU) 12, a first inverter INV1, a second inverter INV2, an electronic servo brake (ESB), and a controller 14.

The drive system 11 includes a first motor-generator MG1 and a second motor-generator MG2, which are each a permanent magnet synchronous motor (a rotating electric motor, an electric motor) having a vector controlled three-phase embedded magnet structure, an engine ENG, a driving force transmission state switching section 15, and a reduction gear D.

The driving force transmission state switching section 15 includes a clutch (not illustrated in the drawings) for coupling the engine ENG and the reduction gear D together, and a transmission unit or fixed gear stage installed between the clutch and the reduction gear D.

In FIG. 1, the bold solid lines illustrate mechanical coupling, the double solid lines illustrate electrical wiring, and the fine solid lines illustrate control lines (including signal lines).

In the vehicle 10, the driving force transmission state switching section 15, and the mechanical couplings extending from the two sides of the driving force transmission state switching section 15, are only employed when using the engine ENG as a drive source to drive wheels (drive wheels) W on the other side of the reduction gear D, through the driving force transmission state switching section 15. Note that configuration may be made such that both the engine ENG and the second motor-generator MG2 are employed during acceleration.

Note that the present disclosure is mainly applied in a state in which the driving force transmission state switching section 15 is employed to disengage the motive force of the engine ENG from the wheel (drive wheel) W side, and in which the second motor-generator MG2 drives the wheels (drive wheels) W.

Figure 2:
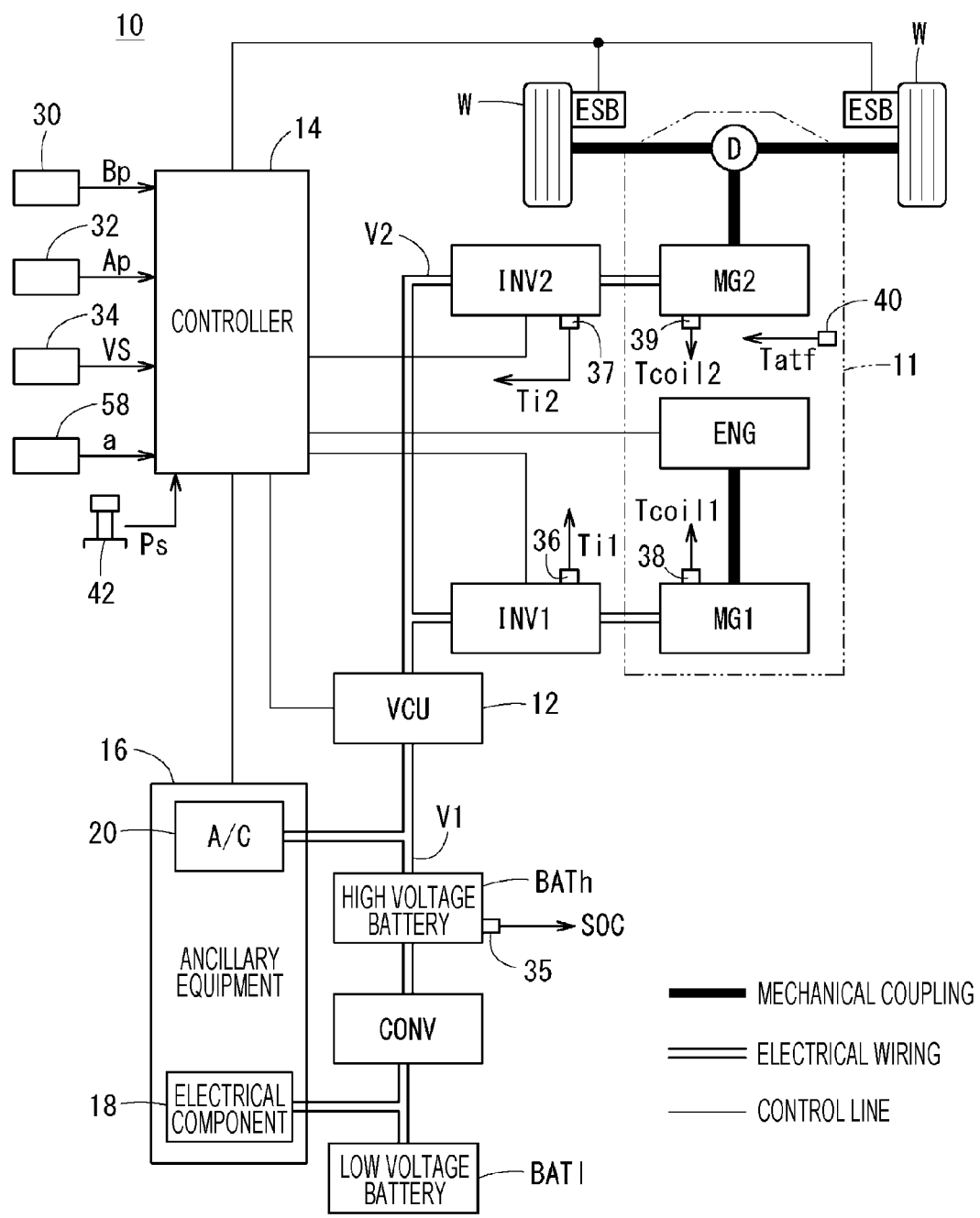
FIG. 2 is a block diagram illustrating a schematic configuration of the vehicle in the example of FIG. 1, partially abbreviated to facilitate understanding of the vehicle.

Thus, as illustrated in FIG. 2, in order to avoid complication and for ease of understanding, in the following, explanation of configuration and operation is based on block diagrams illustrating schematic configurations of the vehicle 10 not depicting the driving force transmission state switching section 15.

The engine ENG drives the first motor-generator MG1 as a generator. In such a situation, the first motor-generator MG1 generates electric power by being driven by the rotational motive force of the engine ENG.

Moreover, in some cases the engine ENG functions as a mechanical load, with the crank shaft rotated in an idling state by being driven by the first motor-generator MG1 operating as an electric motor during braking of the vehicle 10.

The second motor-generator MG2 for driving the vehicle 10 operates (acts) as an electric motor by being supplied with electric power from at least one of the high voltage battery BATh or the first motor-generator MG1, and generates torque to move the vehicle 10. The torque generated by the second motor-generator MG2 is transmitted as drive force through the reduction gear D to the wheels W. The second motor-generator MG2 also operates as a generator during braking of the vehicle 10.

The high voltage battery BATh includes plural storage cells connected together in series, and, for example, supplies a high voltage of from 100 V to 300 V. The storage cells are, for example, lithium ion cells or nickel hydride cells. The high voltage battery BATh may also be configured by a capacitor.

A converter CONV is a DC/DC converter that steps down a direct current output voltage of the high voltage battery BATh to another direct current voltage. The low voltage battery BAT1 stores the voltage stepped down by the converter CONV, and supplies a fixed voltage of, for example, 12 V to an electrical component 18 such as a light contained in ancillary equipment 16, and also acts as a direct current power source for the controller 14, etc.

The VCU 12 steps up a voltage V1, which is the output voltage of the high voltage battery BATh, to a voltage V2, which is an input voltage used by the second motor-generator MG2 when the second motor-generator MG2 operates as an electric motor.

The VCU 12 also steps down the voltage V2, which is the output voltage of the second motor-generator MG2 when the second motor-generator MG2 is operating as a generator during braking of the vehicle 10, to the voltage V1.

Moreover, when the second motor-generator MG2 is operating as a generator during braking of the vehicle 10, the VCU 12 steps the voltage V2 up or down when driving the first motor-generator MG1 through the first inverter INV1 using this generated electric power.

Moreover, the VCU 12 steps down the voltage V2, generated by the first motor-generator MG1 due to the motive force of the engine ENG and converted into a direct current voltage, to the voltage V1.

Namely, the VCU 12 functions as a step-up/step-down converter (a two-way transformer) between the high voltage battery BATh and the first motor-generator MG1 or the second motor-generator MG2.

The electric power stepped down by the VCU 12 to the voltage V1 is supplied as electric drive power to an electric air compressor 20 included in the ancillary equipment 16 and/or as charging power for the high voltage battery BATh.

Figure 3:
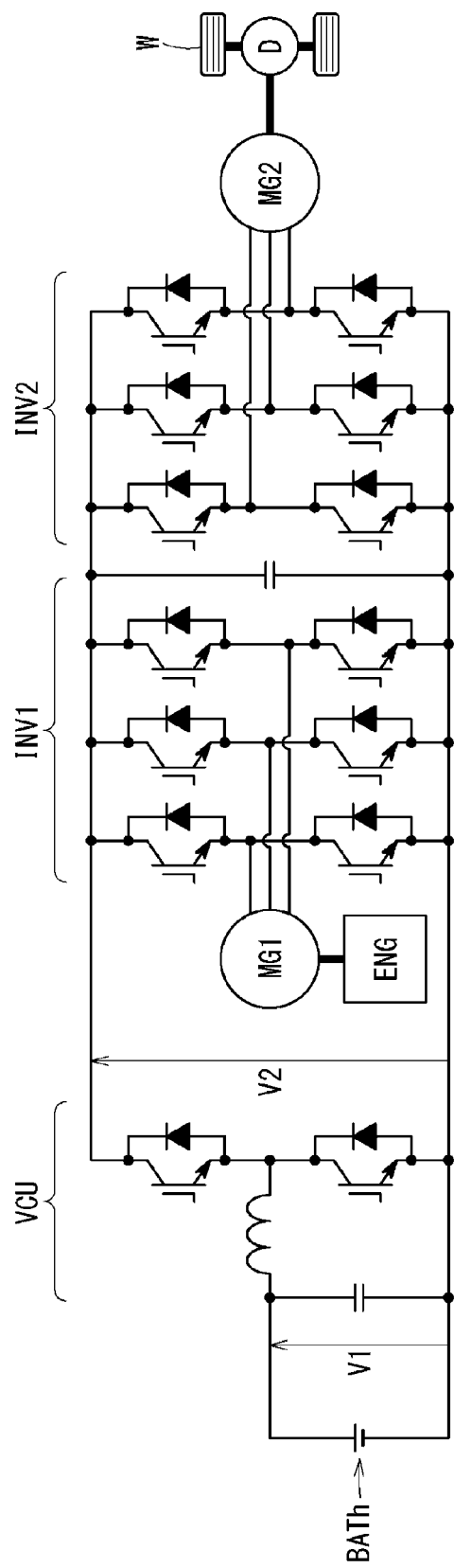
FIG. 3 is a schematic electric circuit diagram illustrating an example configuration of the VCU portion, and the first and second inverter portion in FIG. 1 and FIG. 2.

FIG. 3 is a schematic electric circuit diagram illustrating connection relationships between the high voltage battery BATh, the VCU 12, the first inverter INV1, the second inverter INV2, the first motor-generator MG1, and the second motor-generator MG2.

As illustrated in FIG. 3, the VCU 12 includes a smoothing capacitor, an inductor, and two, upper and lower arm, switching elements. VCU 12 steps up the voltage V2 on the output side to a voltage higher than the voltage V1 by taking the voltage V1 output by the high voltage battery BATh as an input voltage and switching the upper and lower arm switching elements ON or OFF. Moreover, the VCU 12 steps down the voltage V1 on the output side to a voltage lower than the voltage V2 by taking the voltage V2 output by the first inverter INV1 or the second inverter INV2 as an input voltage and switching the two upper and lower arm switching elements ON or OFF.

Note that the voltage V2 is equivalent to the voltage V1 in a state in which the two switching elements of the VCU 12 are not ON/OFF switched, and the upper side switching element is in an ON state, the lower side switching element is in an OFF state.

Moreover, as illustrated in FIG. 3, the first inverter INV1 transforms an alternating current voltage generated by the first motor-generator MG1, driven by the engine ENG, into the direct current voltage V2. Moreover, sometimes the first inverter INV1 transforms the voltage V2, generated by the second motor-generator MG2 during braking of the vehicle 10 and transformed by the second inverter INV2, into alternating current voltage, and supplies three phase current to the first motor-generator MG1. The second inverter INV2 transforms the voltage V2 into alternating current voltage, and supplies the three phase current thereof to the second motor-generator MG2 (in power mode). Moreover, the second inverter INV2 transforms the alternating current voltage generated by the second motor-generator MG2 during braking of the vehicle 10, into the voltage V2 (in regeneration mode).

The electronic servo brake ESB illustrated in FIG. 1 and FIG. 2 brakes the vehicle 10 using a hydraulic system controlled by a non-illustrated electric motor according to a depression amount Bp, which is the operation amount of a brake pedal 30 by a driver of the vehicle 10.

The controller 14, in addition to performing vector control of the first inverter INV1, the first motor-generator MG1, the second inverter INV2, the second motor-generator MG2, and the VCU 12, also performs control of the engine ENG, the electronic servo brake ESB, and the ancillary equipment 16.

Detailed explanation is given later of control by the controller 14, but in brief, the controller 14 acquires, as sensor outputs, the brake depression amount Bp expressing the operation amount of the brake pedal 30 from a depression amount sensor, and also acquires an accelerator opening Ap expressing the operation amount of an accelerator pedal 32 from an accelerator opening sensor, a vehicle speed Vs from a vehicle speed sensor 34, and an acceleration a from an acceleration sensor 58.

The controller 14 also acquires, as sensor outputs, a residual capacity state of charge (SOC) of the high voltage battery BATh from an SOC sensor 35, a temperature Ti1 of the first inverter INV1 from a temperature sensor 36 attached in the vicinity of the switching elements thereof, a temperature Ti2 of the second inverter INV2 from a temperature sensor 37 attached in the vicinity of the switching elements thereof, a temperature Tcoi1 of the first motor-generator MG1 from a temperature sensor 38 attached in the vicinity of the stator coil thereof, a temperature Tcoi2 of the second motor-generator MG2 from a temperature sensor 39 attached in the vicinity of the stator coil thereof, and a temperature Tatf of a cooling medium from a temperature sensor 40 attached to a flow path of cooling oil (cooling medium) circulating inside the drive system 11. Note that the cooling oil cools the inside of the drive system 11, including the first and second motor-generators MG1, MG2.

Moreover, the controller 14 also acquires, as sensor outputs, revolutions/current/rotation angle position and the like from sensors (not illustrated in the drawings) of resolvers and the like of the first and second motor-generators MG1, MG2. The controller 14 also acquires a shift position Ps (for example, a drive position D, a drive position B) expressing the position of a shift lever 42 from a shift position sensor.

Explanation of Basic Inefficient Control

Explanation follows regarding basic operation of inefficient control related to the first motor-generator MG1 of the vehicle 10 basically configured as described above (this being, as described later, mainly control to apply a positive d-axis current Id to the motor-generator, also called strong field control), with reference to FIG. 4.

For example, when the accelerator pedal 32 is released when the vehicle 10 is travelling downhill, the second motor-generator MG2 is switched from a power mode state to a regeneration mode state. In such a situation, the second motor-generator MG2 operates as a generator, and imparts a braking force (regenerative braking) to the vehicle 10, and generates regenerative power. When there is no charging limit, this regenerative power from the second motor-generator MG2 charges the high voltage battery BATh through the second inverter INV2 and the VCU 12, and braking force acts on the vehicle 10 as regenerative braking.

However, when there is a charging limit, such as the high voltage battery BATh being in a fully charged state, the receipt of regenerative power by the high voltage battery BATH is limited.

Thus, in the present embodiment, when the receipt of regenerative power from the second motor-generator MG2 by the high voltage battery BATh (by charging) is limited, in other words when excess electric power is generated in the vehicle 10, the first motor-generator MG1 is driven as an electric motor with the voltage V2 through the first inverter INV1, and the engine ENG is idled as a load (called reverse-driving the engine ENG). Namely, the regenerative power of the second motor-generator MG2 is employed as energy to idle the engine ENG through the first motor-generator MG1.

Figure 4:
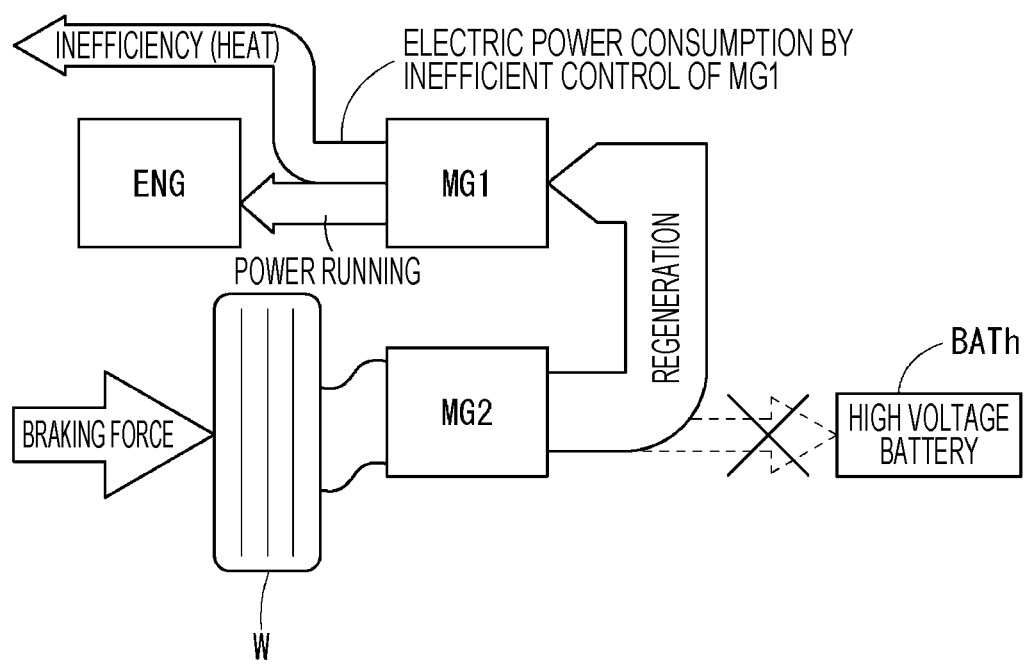
FIG. 4 is an explanatory diagram of basic inefficient control of a vehicle according to an embodiment.

FIG. 4 is an explanatory diagram illustrating a flow of energy during braking of the vehicle 10 when the first motor-generator MG1 is driven as a generator by the regenerative power generated by the second motor-generator MG2, and the engine ENG is idled.

As illustrated in FIG. 4, when the first motor-generator MG1 is in power mode and driving the engine ENG in reverse, a step up in the voltage V2 applied to the first motor-generator MG1 is obtained to the voltage V1 by the VCU 12, and the first motor-generator MG1 is driven at an inefficient operation point by performing strong field control such that the d-axis current Id of the first motor-generator MG1 is increased to mainly a positive value (Id>0).

Note that in normal strong field control (the conventional inefficient control/typical control in FIG. 5), the d-axis current Id not contributing to torque generation is a negative value (Id<0), and vector control is performed to achieve the maximum generated torque for a given current, as maximum torque/current (maximum torque per ampere (MTPA)) control. However, in the present embodiment, the d-axis current Id is stepped up to a current value different from the minimum current of MTPA control, and the first motor-generator MG1 is driven such that the d-axis current Id is mainly a positive value (more precisely, a current value greater than the d-axis current Id0 at the operation point P0 in FIG. 5, Id0<Id (and Id takes both negative and positive values)).

In such a case, the runnable range of the first motor-generator MG1 is increased due to the voltage V2 applied to the first motor-generator MG1 being stepped up. Moreover, the output efficiency is decreased in the first motor-generator MG1 subjected to strong field control, and there is an increase in the amount of heat generated, mainly by copper loss in the stator (armature) coil. The excess part of the regenerative power (excess electric power) of the second motor-generator MG2 is consumed by the amount of heat generated.

Note that in the following explanation, stepping up of the voltage V2 applied to the first motor-generator MG1 in power mode {for generating torque (drive torque/power torque in the rotation direction of the first motor-generator MG1)} or in regeneration mode {for generating torque in the opposite direction to the rotation direction of the first motor-generator MG1 (braking torque/regenerative torque)}, and the strong field control of the first motor-generator MG1, are referred to collectively as inefficient control.

Figure 5:
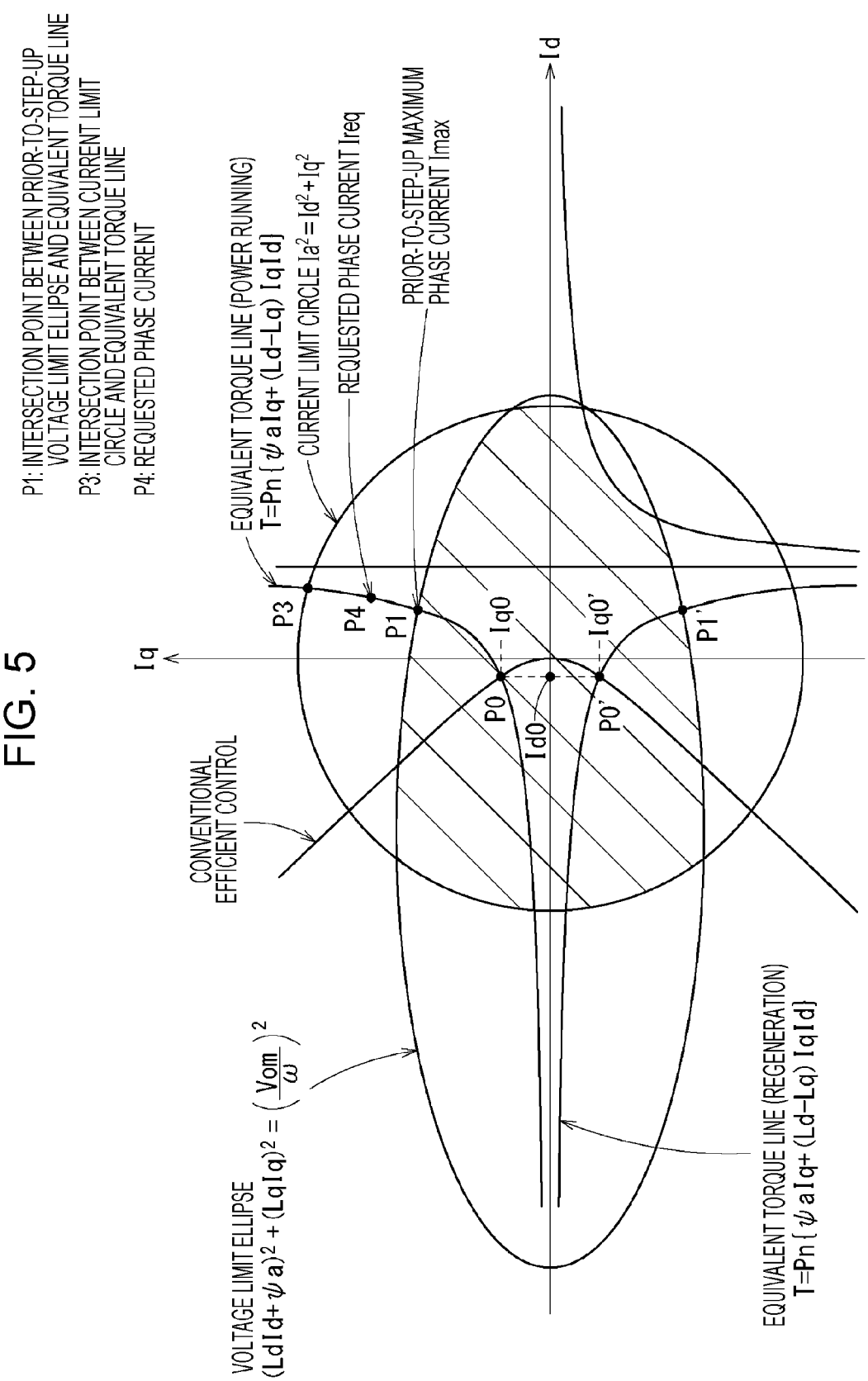
FIG. 5 is an Id-Iq plane diagram to explain conventional efficient control, and inefficient control.

Next, explanation follows regarding operating points on dq-axis coordinates (called the Id-Iq plane) in a motor-generator subject to inefficient control, as typified by the first motor-generator MG1, and regarding the voltage applied to the motor-generator, with reference to the Id-Iq plane diagram of FIG. 5.

The range of the operating points of a motor-generator is limited by the maximum phase current Ia able to be supplied to the motor-generator, and by the voltage V2 applied to the motor-generator (the direct current terminal voltage of the inverter).

The amplitude of the current (Id, Iq) of the motor-generator is limited by the maximum phase current Ia, and so Equation (1) below (current limit circle) should be satisfied.

$$Id^2+Iq^2 \leq Ia^2 \quad (1)$$

Wherein: Id is the d-axis current, Iq is the q-axis current, and Ia is the maximum phase current. Note that Ia is also employed for a current vector Ia, as Ia is a composite vector current of the current vector Id and the current vector Iq.

An induction voltage (Vd, Va) of the motor-generator is expressed by Equation (2) below. Note that normally Equation (2) is expressed in matrix form.

$$Vd = O \times Id + (-\omega Ld) \times Iq + O$$

$$Vq = (\omega Ld) \times Id + O \times Iq + \omega \psi a \quad (2)$$

Wherein: ω is the angular velocity of the motor-generator, Lq is the q-axis inductance, Ld is the d-axis inductance, and ψa is the flux linkage (magnetic flux).

From Equation (2), the dq induction voltage (the magnitude of the vector sum of the induction voltage Vd of the armature arising in the d-axis and the induction voltage Vq of the armature arising in the q-axis) Vo is expressed by Equation (3) below.

$$Vo = (Vd^2 + Vq^2)^{1/2}$$

$$= \omega\{(LdId + \psi a)^2 + (LqIq)^2\}^{1/2} \quad (3)$$

The limit voltage of the voltage V2 illustrated in FIG. 2 is denoted Vom. The limit voltage Vom is determined by the voltage V2, and the relationship therebetween is expressed by Equation (4) below, wherein k is a constant determined by the modulation system of switching control of the VCU 12.

$$Vom = kV2 \quad (4)$$

As expressed by Equation (5) below, the dq induction voltage Vo needs to be the limit voltage Vom or lower.

$$Vo \leq Vom \quad (5)$$

Namely, due to the range of operating points of the motor-generator being limited by the voltage, Equation (6) below (voltage limit ellipse) from Equation (3) and Equation (5) needs to be satisfied.

$$(LdId + \psi a)^2 + (LqIq)^2 \leq (Vom/\omega)^2 \quad (6)$$

As stated above, the limit of operation of the motor-generator due to current is expressed by Equation (1).

FIG. 5 illustrates the Id-Iq plane (dq coordinates). In this case Equation (1) is represented by the region inside the current limit circle ($Ia^2 = Id^2 + Iq^2$) in dq coordinates, as illustrated in FIG. 5.

The limit to operation of the motor-generator due to voltage is expressed by Equation (6). Equation (6) is represented by the region inside the voltage limit ellipse {$(LdId + \psi a)^2 + (LqIq)^2 = (Vom/\omega)^2$} in dq coordinates, as illustrated in FIG. 5. The range of current able to be supplied to the motor-generator is the range satisfying both Equation (1) and Equation (6), and this range is illustrated by the hatched range in FIG. 5.

The torque T of the motor-generator is expressed by Equation (7) below.

$$T = Pn\{\psi a Iq + (Ld - Lq)IdIq\} \quad (7)$$

Wherein, Pn is the number of poles of the motor-generator. The first element on the right hand side is torque due to permanent magnets, and the second element on the right hand side is reluctance torque.

An equation expressing an equivalent torque line (equivalent torque curve, constant torque line, or constant torque curve) from solving Equation (7) for Iq is expressed by Equation (8) below.

$$Iq = T/(Pn\{\psi a Iq + (Ld - Lq)Id\}) \quad (8)$$

Equation (8) is represented by a hyperbola with asymptotes Id=ψa/(Lq−Ld), Iq=0 (the curves on the power side and regenerative side of the equivalent torque lines T in FIG. 5).

In control of operating points of a motor-generator not subject to inefficient control, the following are, for example, performed: maximum torque/current control to achieve maximum torque for a given current (control in which the current vector is orthogonal to the tangent to a fixed torque curve at the operating points); or maximum efficiency control to achieve the minimum loss taking into consideration not only the copper loss, but also core loss and the like (in which often the operating points are further advanced in phase than in maximum torque control, namely, the d-axis current Id is shifted toward the negative direction).

In the example illustrated in FIG. 5, a motor-generator is being driven at operating points (also referred to as intersection points) P0 etc., on a curve of typical conventional efficiency control maximum torque per ampere (MTPA) control.

In contrast thereto, in the inefficient control of the present embodiment, as illustrated in FIG. 5, strong field control is performed such that the d-axis current Id of the motor-generator is, for example, a larger positive value, such as the value at operating point (intersection point) P4. The voltage V2 applied to the motor-generator needs to be raised in order to perform such strong field control. The amplitude of the current Ia (Id, Iq) of the motor-generator is increased due to raising the voltage V2 applied to the motor-generator, enabling the operating point of the motor-generator to be shifted. The torque needed for reverse-driving the engine ENG, this being a load on the motor-generator, is determined by friction, according to oil viscosity, etc., that changes with engine revolutions, temperature, and the like. However, qualitatively, since such torque asymptotically approaches a fixed torque for smaller torque, the d-axis current Id is readily shifted in the positive direction.

Moreover, when the limit voltage Vom of the voltage V2 is large and the angular velocity ω of the motor-generator is small, due to the area of the voltage limit ellipse of Equation (6) becoming larger, the amplitude of the current Ia (Id, Iq) of the motor-generator is readily increased.

Thus, it is apparent that inefficient control of the motor-generator can be efficiently performed by appropriately controlling the limit voltage Vom of the voltage V2 and the angular velocity ω of the motor-generator.

Under inefficient control on the power side of the motor-generator (Id>Id0, Iq>0) in FIG. 5, the maximum phase current Imax prior to stepping up the voltage V2 is limited at the intersection point (operating point) P1 between the voltage limit ellipse and the equivalent torque line.

Note that under inefficient control on the regenerative side of the motor-generator (Id>Id0, Iq<0), the maximum phase current Imax prior to stepping up the voltage V2 is limited at the intersection point P1' between the voltage limit ellipse and the equivalent torque line.

Detailed Explanation of Operation of Inefficient Control

Figure 6:
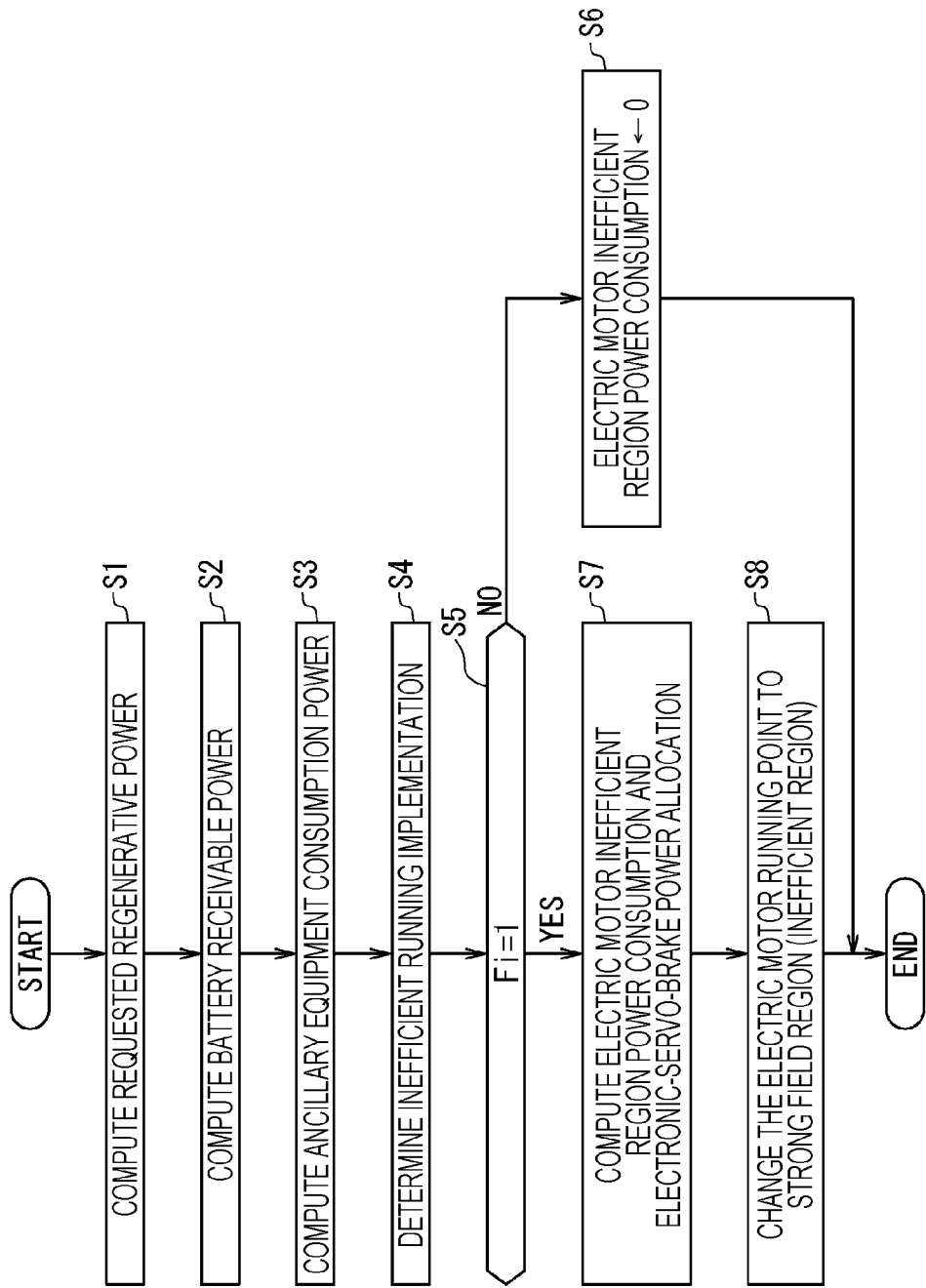
FIG. 6 is a flowchart to accompany explanation of a specific operation of inefficient control of a vehicle according to the embodiment.

Detailed explanation follows regarding a specific example of inefficient control (inefficient running) when a requested regenerative power Preg in the vehicle 10 is larger than the power receivable by the high voltage battery BATh, with reference to the flowchart in FIG. 6.

At step S1, the controller 14 computes the requested regenerative power Preg of the second motor-generator MG2. For the requested regenerative power Preg, a target deceleration G is, as hitherto, computed based on a road gradient (which may either be from a gradient detection sensor or from estimation), a shift position Ps of the shift lever 42 (such as drive position D, drive position B), a degree of opening Ap of the accelerator pedal 32 (in this case the degree of opening Ap=0 (state of opening of the accelerator pedal 32)), vehicle speed Vs from the vehicle speed sensor 34, and the depression amount Bp of the brake pedal 30. The requested regenerative power Preg is then computed based on the target deceleration G.

The requested regenerative power Preg is computed here according to the downslope gradient such that the vehicle speed Vs is substantially constant.

Next, at step S2, the receivable power of the high voltage battery BATh (battery receivable power) Pbatin is computed.

Figure 7:
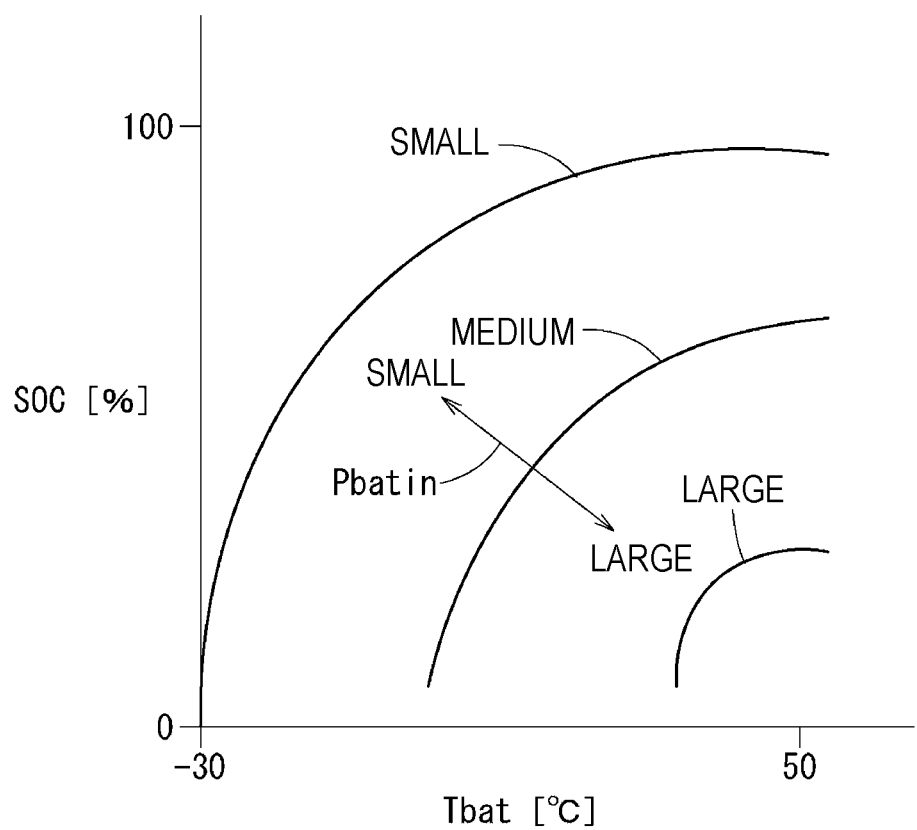
FIG. 7 is a characteristics chart illustrating battery receivable power.

As illustrated by the characteristics (map) in FIG. 7, the battery receivable power Pbatin=0 kW when the residual capacity SOC detected by a SOC sensor 35 is 100%.

When the residual capacity SOC is less than 100%, the battery receivable power Pbatin is acquired by reference to the characteristics (map), with the residual capacity SOC, and the battery temperature Tbat (for example, from about −30° C. to about +50° C., as illustrated) as input values. These characteristics are generated in advance, and are characteristics such that, for a given residual capacity SOC, the higher the battery temperature Tbat, the larger the battery receivable power Pbatin. Similarly, for example, the characteristics are such that, for a given battery temperature Tbat, the lower the residual capacity SOC, the larger the battery receivable power Pbatin.

Next, at step S3, an auxiliary power consumption Paux is computed. The auxiliary power consumption Paux is computed by summing the electric power consumption of the electrical air compressor 20, the electric power consumption of the converter CONV, and the electric power consumption of the electrical component 18.

Next, at step S4, determination is made as to whether or not there is a need to implement inefficient running. In such cases, if the requested regenerative power Preg is consumable by the battery receivable power Pbatin and the auxiliary power consumption Paux (Preg≤Pbatin+Paux), then the requested regenerative power Preg can be consumed (including by charging) in the vehicle 10 without performing inefficient running. An inefficient running flag Fi is accordingly reset (Fi←0). However, if the requested regenerative power Preg is greater than the combined electric power consumption of the battery receivable power Pbatin and the auxiliary power consumption Paux (Preg>Pbatin+Paux), determination is made that inefficient running needs to be performed, and the inefficient running flag Fi is set (Fi←1).

Next, at step S5, determination is made as to whether the inefficient running flag Fi is set (Fi=1) or not (Fi=0).

When the inefficient running flag Fi is not set (Fi=0) (NO at step S5), there is no need to consume the requested regenerative power Preg of the second motor-generator MG2 in the inefficient region of the first motor-generator MG1 (herein, also referred to simply as the electric motor). Therefore, at step S6, an electric motor inefficient region power consumption Pine is set to zero (Pine←0), and processing returns to step S1.

When the inefficient running flag Fi is set (Fi=1) (YES at step S5), the electric motor inefficient region power consumption Pine is computed at step S7, and an electronic-servo-brake power allocation Pesv is computed.

Figure 8:
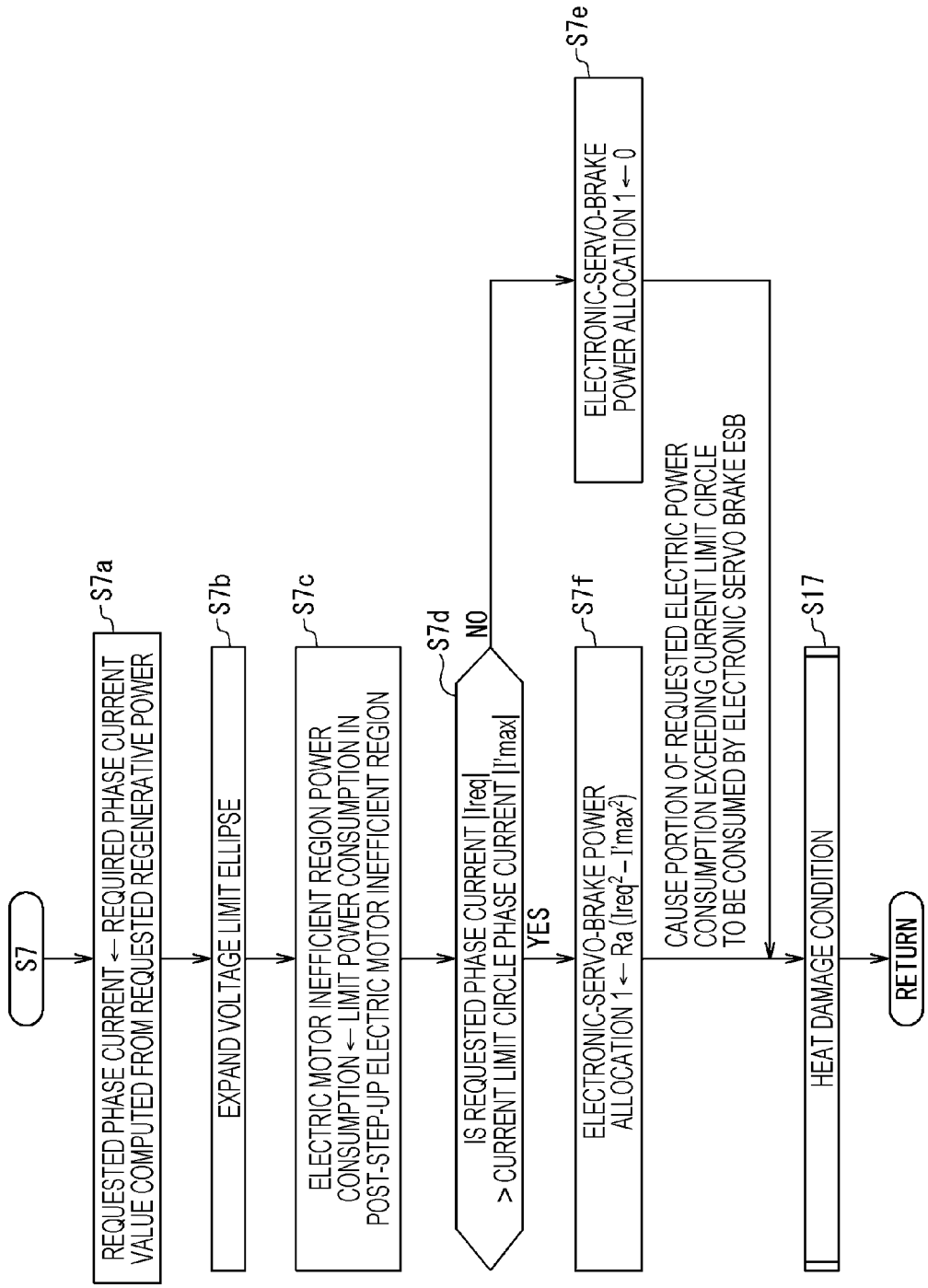
FIG. 8 is a flowchart illustrating details of processing of step S7 in the flowchart of FIG. 6.

FIG. 8 is a detailed flowchart of step S7.

At step S7a, a required phase current value computed from the requested regenerative power Preg is taken as a requested phase current Ireq.

As illustrated in FIG. 5, the requested phase current Ireq is larger than the prior-to-step-up maximum phase current Imax (=Ia), and so, at step S7b, in order to secure the requested phase current Ireq, the limit voltage Vom for the voltage V2 is stepped up by the VCU 12 to a limit voltage V'om, and the voltage limit ellipse is expanded as expressed in the following Equation (6').

$$(LdId+\psi a)^2 + (LqIq)^2 \leq (V'om/\omega)^2 \quad (6')$$

Next, at step S7c, a limit power consumption in the electric motor inefficient region after step up is set as the electric motor inefficient region power consumption Pine.

Next, at step S7d, the magnitudes (absolute values) of the requested phase current Ireq and a post-step-up current (also referred to as the current limit circle phase current) I'max of the current limit circle are compared, and determination is made as to whether or not |Ireq|>|I'max|.

When the magnitude of the requested phase current Ireq is smaller than, or equal to, the magnitude of the current limit circle phase current I'max (NO at step S7d), there is no need for a power allocation to the electronic servo brake ESB. Hence, at step S7e, the electronic-servo-brake power allocation 1 is set to 0.

Figure 9:
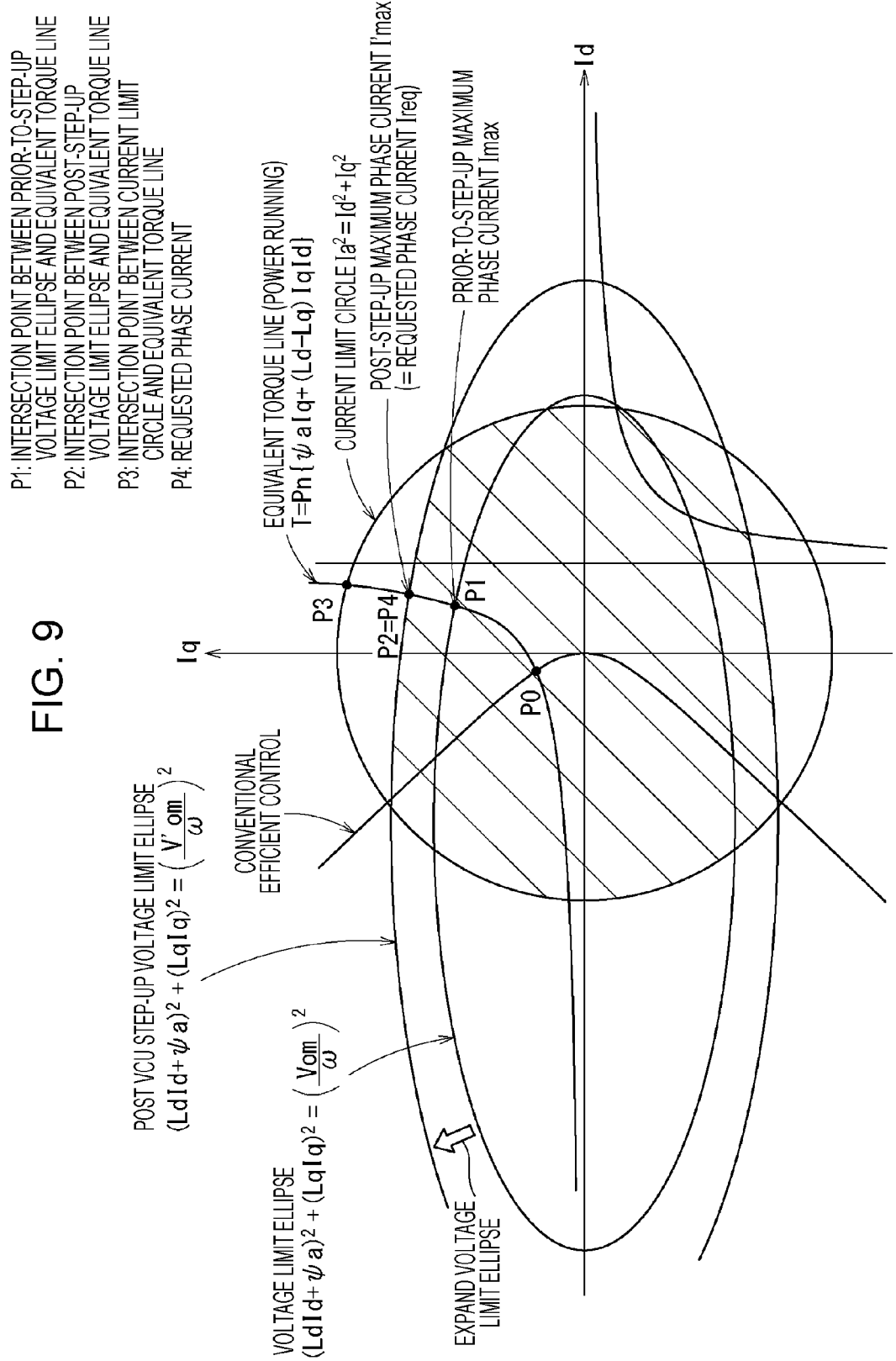
FIG. 9 is an Id-Iq plane diagram to accompany explanation of expanding a voltage limit ellipse when a requested phase current and a post-step-up maximum phase current are the same as each other.

In such a situation, as illustrated in FIG. 9, the voltage limit ellipse expressed by Equation (6) is expanded to the post-VCU step-up voltage limit ellipse expressed by Equation (6') by the VCU 12 stepping up (stepping up voltage V2 such that limit voltage Vom becomes limit voltage V'om) so as to enable the relationship requested phase current Ireq=I'max to be secured.

When doing so, in order to enable consumption of the requested regenerative power Preg as heat by inefficient control of the first motor-generator MG1, the intersection point P1 of the pre-step-up maximum phase current Imax is changed to further along an equivalent torque line in the strong field direction (a direction to further increase the positive value of the d-axis current), as far as the intersection point P2 (=P4) of the post-step-up maximum phase current I'max.

However, there is a need for an allocation of power to the electronic servo brake ESB when determined at step S7d that the magnitude of the requested phase current Ireq is larger than the magnitude of the current limit circle phase current I'max (YES at step S7d). Hence, at step S7f, the electronic-servo-brake power allocation 1 is set to Ra (Ireq$^2$−I'max$^2$).

Figure 10:
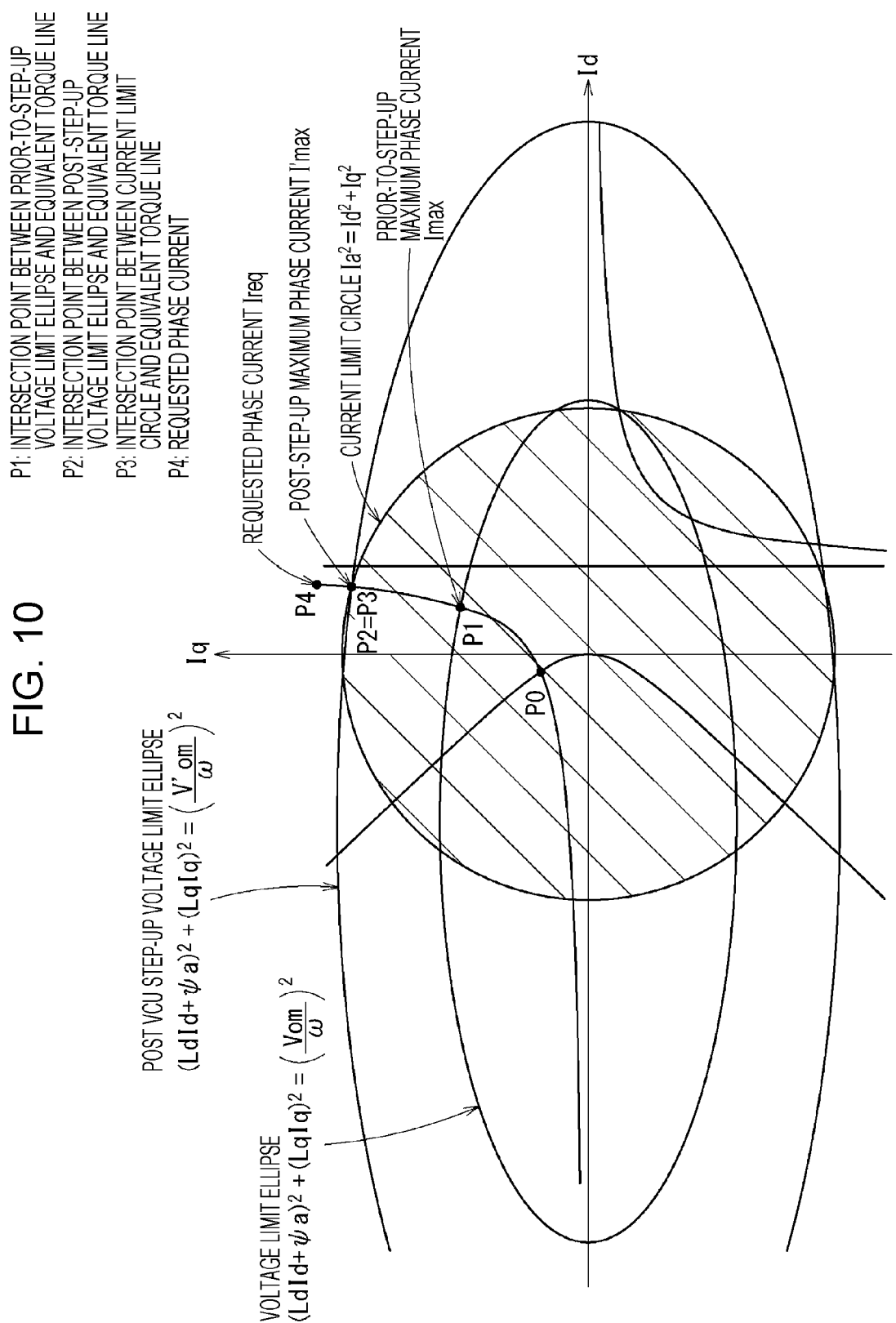
FIG. 10 is an Id-Iq plane diagram to accompany explanation of expanding a voltage limit ellipse when a requested phase current is larger than a post-step-up maximum phase current.

In such cases, as illustrated in FIG. 10, the post-VCU step-up voltage limit ellipse expressed by Equation (6') is expanded to a range intersecting with the current limit circle, which is the limit of capability of the VCU 12. When doing so, in order to enable consumption of the requested regenerative power Preg as heat by inefficient control of the first motor-generator MG1, the intersection point P1 of the pre-step-up maximum phase current Imax is changed to further along an equivalent torque line in the strong field direction (a direction to further increase the positive value of the d-axis current), as far as the intersection point P2 (=P4) of the post-step-up maximum phase current I'max. The amount of the requested electric power portion Ra (Ireq$^2$−I'max$^2$) from the intersection point P2 to the point P4 is consumed by the electronic servo brake ESB as the electronic-servo-brake power allocation 1. As a result, the braking force due to the electronic servo brake ESB is added to the regenerative braking force of the second motor-generator MG2.

Next, at step S17, during performing, or as a result of performing, electric motor inefficient running with an expanded voltage limit ellipse, determination processing is performed as to whether or not a limit temperature of the first motor-generator MG1 has been reached, as a heat damage condition.

Figure 11:
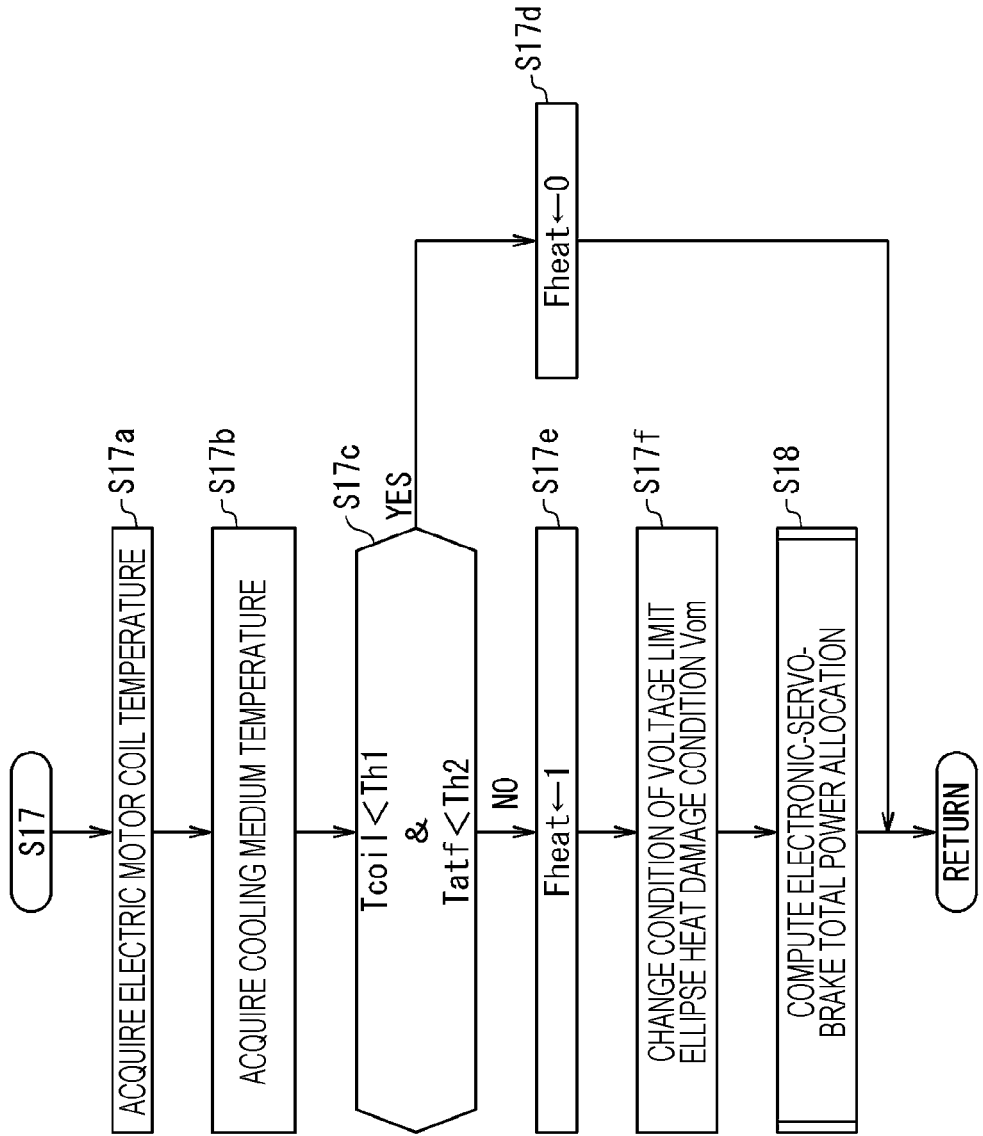
FIG. 11 is a flowchart illustrating details of processing of step S17 in the flowchart of FIG. 8.

FIG. 11 is a detailed flowchart of step S17.

At step S17a, an electric motor coil temperature Tcoil is acquired by the temperature sensor 38 (FIG. 2), for example a thermistor provided to the electric motor coil of the first motor-generator MG1.

Moreover, at step S17b, a cooling medium temperature Tatf, which is the temperature of oil for cooling the first motor-generator MG1, is acquired from the temperature sensor 40.

Next, at step S17c, determination is made as to whether or not the electric motor coil temperature Tcoil is less than a threshold temperature value Th1, which is a control temperature (Tcoil<Tth1), and the cooling medium temperature Tatf is less than a threshold temperature value Th2, which is a control temperature (Tatf<Th2).

When the determination of step S17c is affirmative (Tcoil<Th1, and Tatf<Th2) (YES at step S17c), determination is made that the first motor-generator MG1 is not subject to heat damage, and, at step S17d, a heat damage flag Fheat is reset (Fheat←0), and processing returns to step S1.

However, determination at step S17c is negative (NO at step S17c) when at least one of the temperature determinations is negative during temperature determination at step S17c. In such cases, since the first motor-generator MG1 needs to be protected from heat damage, first the heat damage flag Fheat is set (Fheat←1) at step S17e.

Next, at step S17f, the conditions of the heat damage condition Vom related to the voltage limit ellipse are changed, and, at step S18, the total power allocation of the electronic servo brake ESB is computed.

Figure 13:
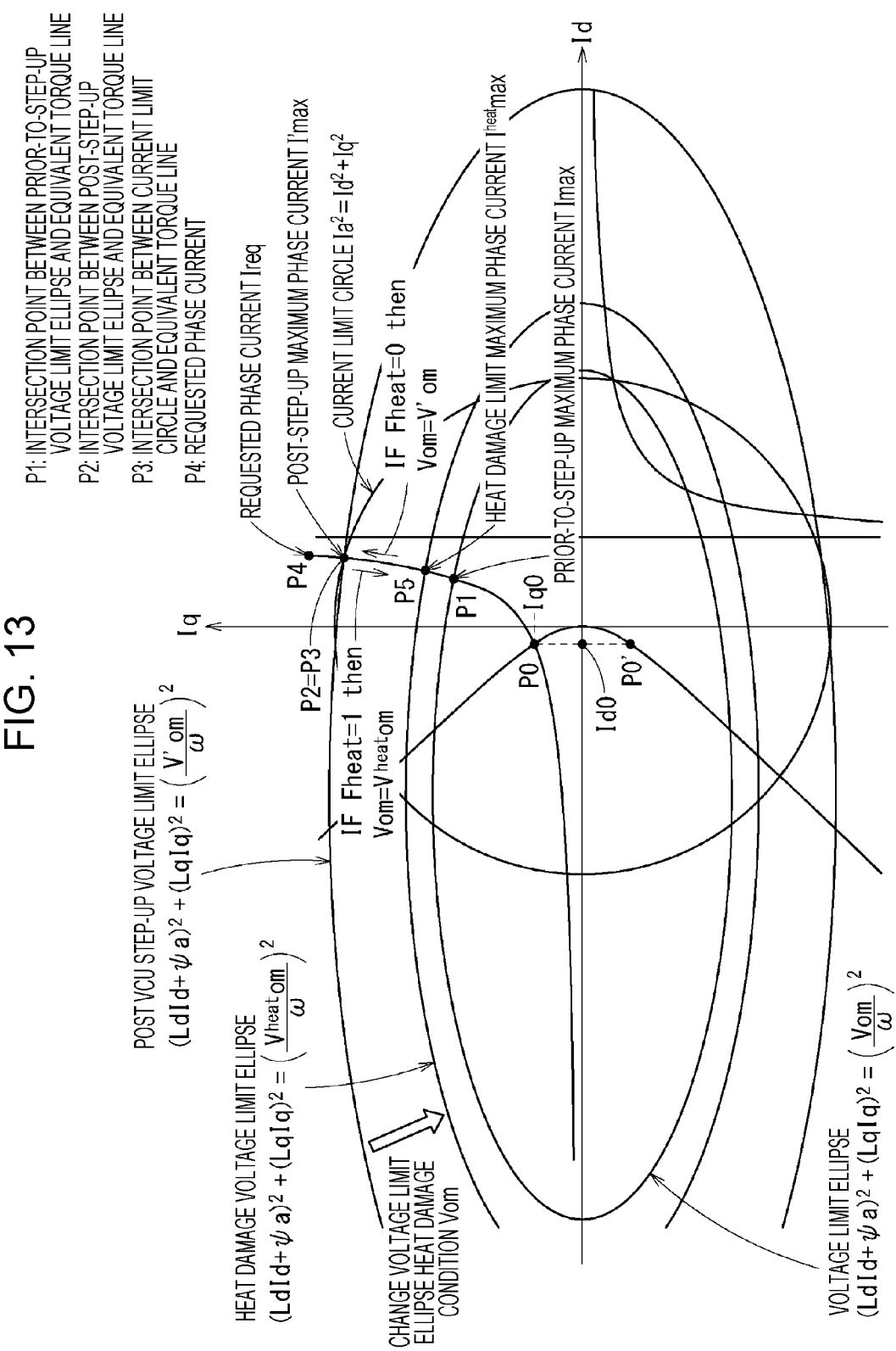
FIG. 13 is an Id-Iq plane diagram to accompany explanation of overall operation.

Explanation follows regarding processing of step S17f and step S18, with reference to FIG. 13.

When the heat damage condition Fheat=1 is established, the V'om is returned to V$^{heat}$om as illustrated by Equation (5") below, namely, the voltage V2 is lowered, and the electric motor inefficient region is contracted to a voltage limit ellipse enabling running even at high temperature. In such cases, the phase current Imax is decreased to intersection point P5 while tracing along an equivalent torque line of electric motor shaft end requested torque characteristics.

$$(LdId+\psi a)^2 + (LqIq)^2 \leq (V^{heat}om/\psi)^2 \quad (5'')$$

In such cases, a total power allocation Pesball of the electronic servo brake ESB is computed at step S18.

Figure 12:
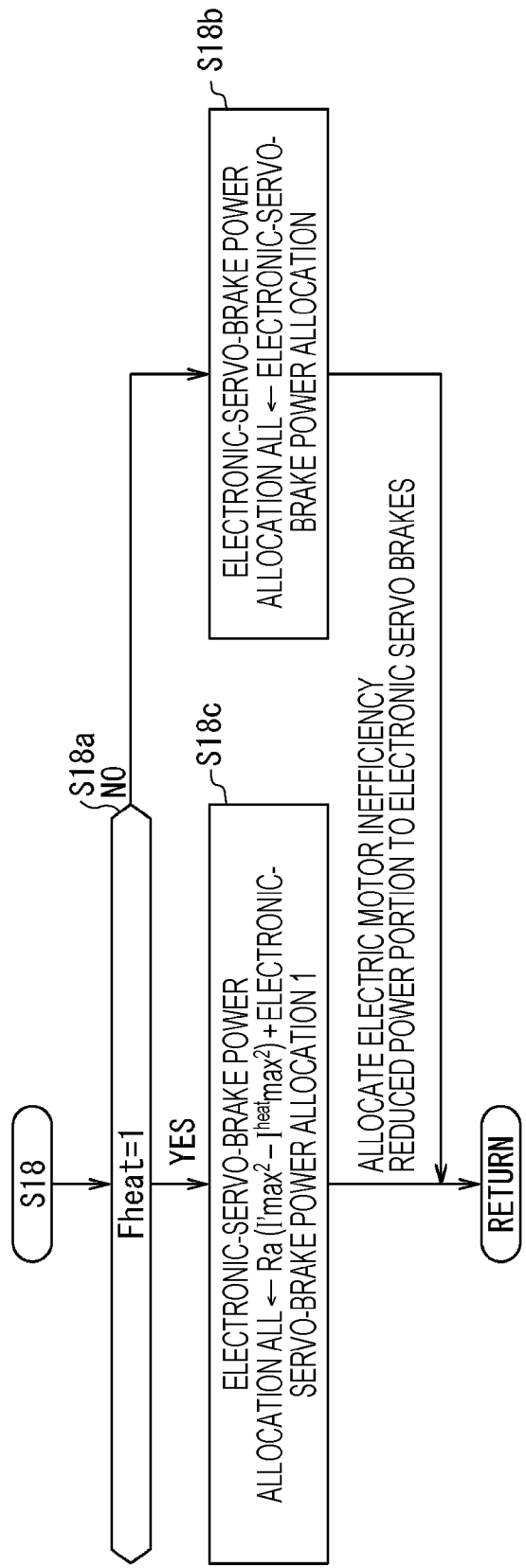
FIG. 12 is a flowchart illustrating details of processing of step S18 in the flowchart of FIG. 11.

FIG. 12 is detailed flowchart of step S18.

At step S18a, the determination content explained in step S17c is employed again to determine whether or not the heat damage flag Fheat is Fheat=1, or Fheat=0. When the heat damage flag Fheat is Fheat=0, since the heat damage condition has been cleared, the phase current Ia of the phase current I$^{heat}$max is returned along the equivalent torque line to phase current I'max, switching from the operating point (intersection point) P5 to the operating point (intersection point) P3. Thereby, as illustrated in step S18b, the total power allocation Pesball of the electronic servo brake ESB (also referred to as the electronic-servo-brake power allocation ALL) can be returned to the power allocation 1 of the electronic servo brake ESB computed at step S7f.

However, when determined at step S18a that the heat damage flag Fheat is Fheat=1, since the heat damage condition has not been cleared, at the operating point (intersection point) P5 of the phase current I$^{heat}$max, the total power allocation Pesball of the electronic servo brake ESB is the combined power of the electronic-servo-brake power allocation 1 for the portion from the operating point (intersection point) P3 to the operating point (intersection point) P4=Ra (Ireq$^2$−I'max$^2$), as computed at step S7f, and the electronic-servo-brake power allocation 1 from operating point (intersection point) P3 to operating point (intersection point) P5=Ra (I'max$^2$−I$^{heat}$max$^2$). The total power allocation Pesball is allocated for consumption in the electronic servo brake ESB.

The first motor-generator MG1 can thereby be protected from heat damage.

Note that by, at step S17 described above, contracting the voltage limit ellipse when the heat damage condition is established, the running point of the electric motor is moved from P3 to P5. However, the running point of the electric motor may be shifted from P3 to P5 without contracting the voltage limit ellipse, namely, without lowering the voltage V2 (stepped-up voltage).

SUMMARY AND MODIFIED EXAMPLES OF EMBODIMENTS

The vehicle 10 according to the present embodiment includes: the high voltage battery BATh, serving as an energy storage device; the first and second inverters INV1, INV2 serving as a drive device (a motor driver) capable of two-way conversion between direct current and alternating current; the first motor-generator MG1 and/or the second motor-generator MG2 serving as rotating electric motor(s) connected to an alternating current side of the first and second inverters INV1, INV2 serving as the drive device, and having an output shaft connected to a load (the engine ENG serving as a load of the first inverter INV1 and/or the wheels W serving as the load of the second inverter INV2); the VCU 12 serving as a voltage transformer having a low voltage side (voltage V1 side) connected to the high voltage battery BATh and a high voltage (voltage V2) side connected to a direct current side of the first and second inverters INV1, INV2, the voltage transformer stepping up the voltage V1 of the high voltage battery BATh to the voltage V2, and applying the stepped-up voltage V2 to the first and second motor-generators MG1, MG2 through the first and second inverters INV1, INV2, respectively; and the controller 14 that controls the first and second inverters INV1, INV2, the first and second motor-generators MG1, MG2, and the VCU 12.

FIG. 13 mentioned above is a diagram of the Id-Iq plane to accompany explanation of the overall operation.

When excess electric power is generated in the vehicle 10, for example, in cases in which part or all of the regenerative power Preg of the second motor-generator Mg2 is excess, and although consumption is performed in the ancillary equipment 16, the residual capacity SOC is 100% and charging of the high voltage battery BATh is not possible, the controller 14 expands the running range of the first motor-generator MG1 by stepping up the voltage V2, this being the voltage stepped-up by the VCU 12 (limit voltage Vom) (to, for example, the limit voltage V'om at intersection point P3 in FIG. 13). A current value accordingly arises different to the minimum current value for the first motor-generator MG1 to generate a specific drive force (the current value at operating point P0 under the conventional efficient control of FIG. 13) (a current value larger than the d-axis current value (called the d-axis threshold current value) Id0 at the operating point P0 in FIG. 13 (Id>Ido)).

Then, driving the first motor-generator MG1 in the expanded running range, enables the excess electric power, for example part or all of the regenerative power Preg of the second motor-generator MG2, to be consumed by the first motor-generator MG1.

During consumption, if the temperature of the first motor-generator MG1 exceeds a predetermined threshold temperature value Tth, respectively corresponding to a coil temperature Tcoil raised by copper loss, or a temperature Ti1 of the first inverter INV1 or a temperature Tatf of a cooling medium, then the stepped-up voltage V2 is decreased, the running range of the first motor-generator MG1 is contracted, and the electric power consumption of the first motor-generator MG1 is decreased (for example, to a limit voltage $V^{heat}$om, at operating point (intersection point) P5 in FIG. 13).

Due to performing such control, excess electric power generated in the vehicle 10, which is neither able to be consumed in the ancillary equipment 16 nor charged in the high voltage battery BATh, can be consumed, and overheating of the first motor-generator MG1 or the first inverter INV1 can be prevented.

Note that the d-axis current Id is increased along the equivalent torque line when expanding the running range of the first motor-generator MG1 by stepping up the voltage V2, and the d-axis current Id is decreased along the equivalent torque line when decreasing the stepped-up voltage V2. This enables the electric power consumption by the first motor-generator MG1 to be varied, while holding the shaft end torque (the torque arising at the output shaft) of the first motor-generator MG1 constant.

In particular, when the d-axis current Id is strong field controlled (inefficiently controlled) so as to be a positive value, a secondary advantageous effect is achieved of being able to prevent a reduction in magnetism of permanent magnets accompanying a rise in temperature of the first motor-generator MG1. Namely, due to the strong field control (inefficient control), even though permanent magnets reach a high temperature, due to a magnetic field being applied to the permanent magnets in the direction of magnetization and a demagnetizing field not being applied to the permanent magnets, the resistance to demagnetization is raised.

In addition, due to the strong field control (inefficient control), an effect is exhibited of raised attraction force (magnetic restraint force) between the non-illustrated permanent magnets of the rotor and armature of the stator, the magnetic restraint force in the rotation direction of the rotor and the axial direction of the rotor is raised, and a secondary effect is exhibited of improving the NV characteristics of the first motor-generator MG1.

In this case, when the excess electric power generated by the vehicle 10 itself is the regenerative power Preg arising from braking use, braking force due to the regenerative power Preg is provided by electric power consumption through power running the first motor-generator MG1, and any insufficiency still arising is supplemented by mechanical brakes, in this embodiment by the electronic servo brake ESB, thereby securing braking force. Moreover, the behavior of the vehicle is suppressed from changing due to control being performed along the equivalent torque line.

The vehicle 10 is a hybrid vehicle, and the present embodiment enables the intervention of mechanical braking to be suppressed to a minimum, enabling prolonged usage of friction members for mechanical braking. The friction members for mechanical braking can also be reduced in size if the same usage duration as normal is to be achieved.

Figure 14:
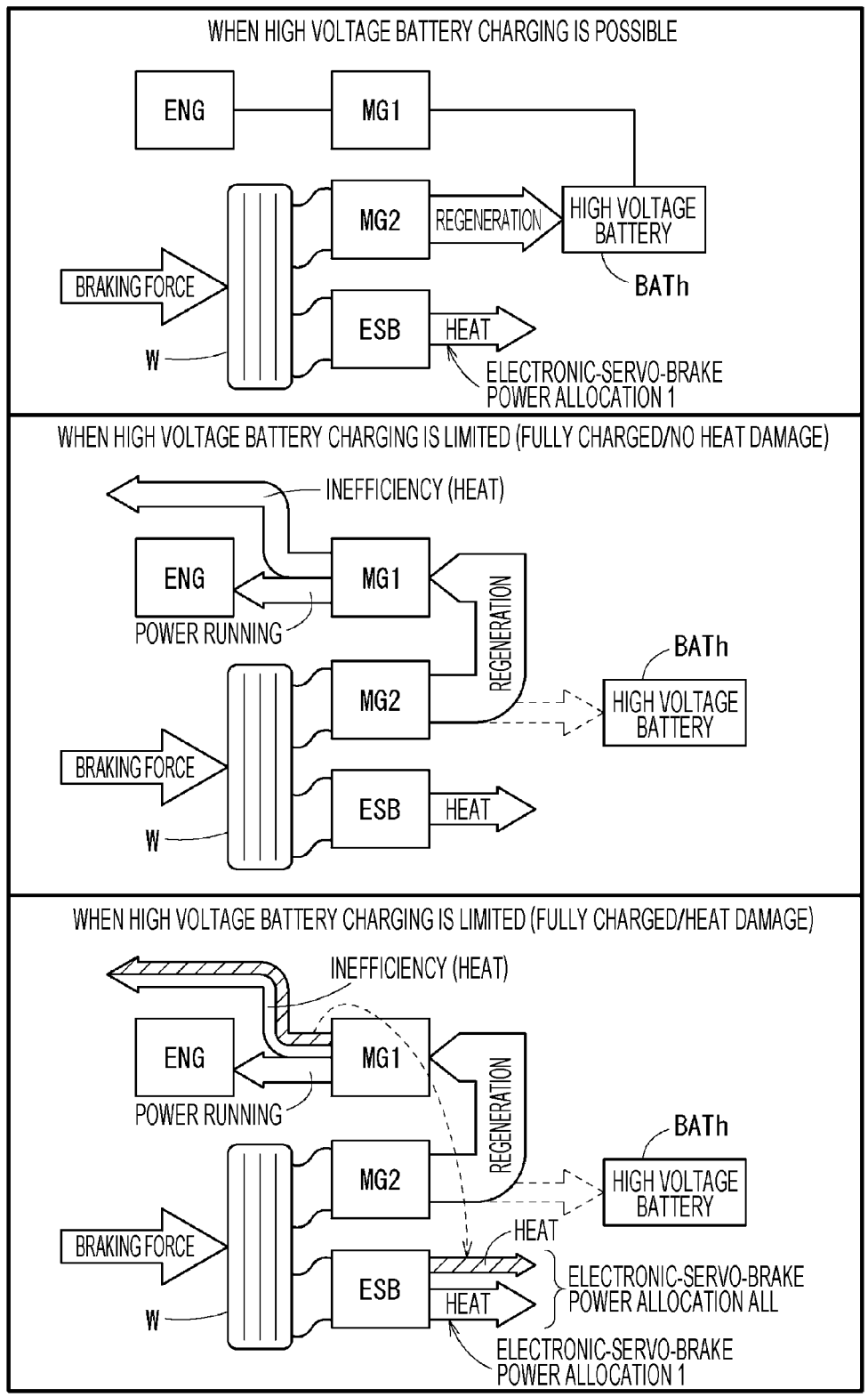
FIG. 14 is an explanatory diagram of operation of an embodiment.

Simple explanation follows regarding the operation of the present embodiment, with reference to FIG. 14.

When charging of the high voltage battery BATh is possible, the braking force on wheels W is secured by the regenerative power of the second motor-generator MG2 and the heat generation of the electronic servo brake ESB (the electronic-servo-brake power allocation 1), and the regenerative power charges the high voltage battery BATh. The generated power of the first motor-generator MG1 rotated by the engine E also charges the high voltage battery BATh (the top section in FIG. 14).

When charging of the high voltage battery BATh is limited (the high voltage battery BATh is fully charged), and when there is no heat damage to the first motor-generator MG1, etc., the engine ENG is idled by power running the first motor-generator MG1 along the equivalent torque line of the inefficient region using the regenerative power Preg of the second motor generator MG2. The regenerative power Preg is converted into heat in the inefficient region of the first motor-generator MG1 (the intersection point P2=P3 in FIG. 13). In such cases, the heat generated by the electronic servo brake ESB is not changed (the middle section in FIG. 14).

However, when charging the high voltage battery BATh is limited (the high voltage battery BATh is fully charged), and there is heat damage to the first motor-generator MG1, etc., as explained in the embodiment above, the engine ENG is idled by power running the first motor-generator MG1 using the regenerative power Preg of the second motor generator MG2 along the equivalent torque line of the inefficient region of the first motor-generator MG1, and the regenerative power Preg is converted into heat in the inefficient region of the first motor-generator MG1; however, the electric power consumption in the inefficient region is reduced as indicated by the hatched region (intersection point P5 in FIG. 13). The electronic servo brake ESB allocation portion is increased by this amount, and so the heat generated by the electronic servo brake ESB is increased (the bottom section in FIG. 14).

Thus in the embodiment described above, when determined that the temperatures of the elements (components) configuring the second motor-generator MG2 and the second inverter INV2 are a control temperature or above, the VCU 12 stepped-up voltage V2 is lowered, so as to lower the upper limit to the running range of the inefficient region of the second motor-generator MG2.

Such a configuration enables damage to the second motor-generator MG2 and the second inverter INV2 due excessive rise in temperature to be forestalled, by merely changing control (without increasing cost), without adding a new device (without changing the configuration). Moreover, the behavior of the vehicle 10 can also be suppressed from being affected.

MODIFIED EXAMPLES

Figure 15:
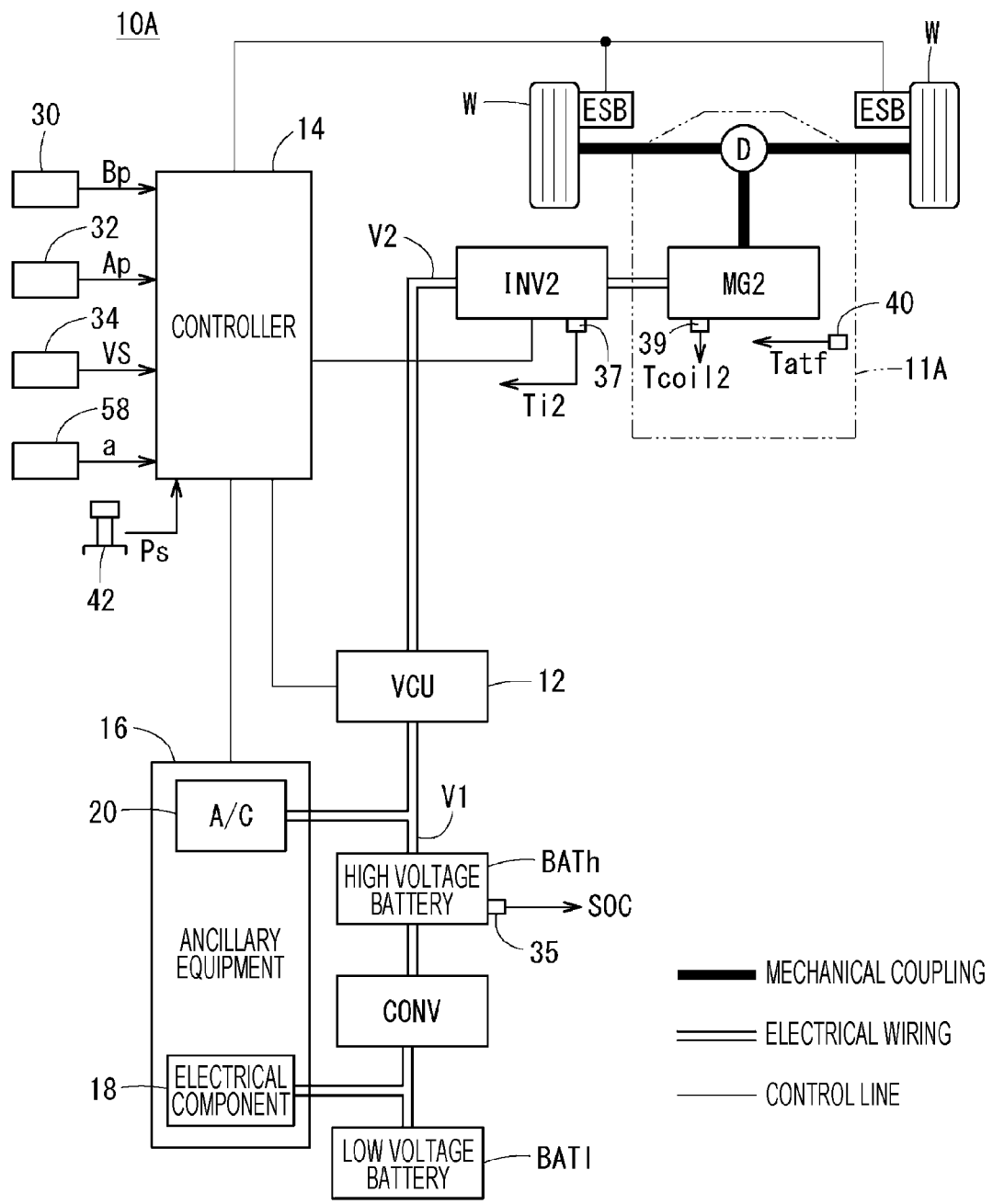
FIG. 15 is a block diagram illustrating a schematic configuration of a vehicle (electric car) of a modified example.

FIG. 15 is a block diagram illustrating a schematic configuration of a vehicle 10A of a modified example.

The vehicle 10A of the modified example is what is referred to as an electric car. In the vehicle 10A during, for example, travel on a long downward slope (during a descent), when regenerative power Preg of the second motor-generator MG2 is generated in excess, the excess electric power can be consumed by operating the second motor-generator MG2 in the inefficient region (Id>Id0, particularly Id>0) along the equivalent torque line (regeneration) on the regeneration side (Id>0, Iq<0) illustrated in FIG. 5, similarly to as explained in the previous embodiment.

Note that the voltage V2 may be stepped up on the regeneration side, and inefficient control performed during regeneration by the second motor-generator MG2 in the expanded running range.

Note that the present disclosure is not limited to the above embodiments, and obviously various configurations may be adopted based on the content of the present specification.

The present disclosure describes a vehicle capable of consuming excess electric power generated in the vehicle by using a rotating electric motor, without causing a deterioration of NV characteristics. Moreover, while suppressing vehicle behavior from being affected, the vehicle is also capable of preventing excessive heating of the rotating electric motor or a drive device if, during consumption of the excess electric power, the temperature of the rotating electric motor or the temperature of the drive device exceeds a threshold temperature value.

The present disclosure describes a vehicle including a rotating electric motor, the vehicle including an energy storage device, a drive device capable of two-way conversion between direct current and alternating current, and a rotating electric motor connected to an alternating current side of the drive device and having an output shaft connected to a load. The vehicle also includes a voltage transformer having a low voltage side connected to the energy storage device and a high voltage side connected to a direct current side of the drive device. The voltage transformer steps up the voltage of the energy storage device, and applies the stepped-up voltage to the rotating electric motor through the drive device. The vehicle also includes a controller that controls the drive device, the rotating electric motor, and the voltage transformer. The controller drives the rotating electric motor with a first current value, different from a minimum current value for the rotating electric motor to generate a specific drive force, so as to cause excess electric power to be consumed by the rotating electric motor. The controller also, when a temperature of the rotating electric motor or a temperature of the drive device exceeds a threshold temperature value, drives the rotating electric motor with a second current value smaller than the first current value and decreases the electric power consumption of the rotating electric motor.

According to this aspect of the present disclosure, when an excess of electric power (excess electric power) is generated in the vehicle, the excess electric power generated in the vehicle is consumable by the rotating electric motor, under conditions in which the temperature of the rotating electric motor and the temperature of the drive device are not high, and are a threshold value or lower, by expanding a running range of the rotating electric motor in an inefficient region (a region of current values different to the minimum current value for the rotating electric motor to generate a specific drive force). Moreover, overheating of the rotating electric motor or the drive device can be prevented by reducing the electric power consumption of the rotating electric motor if, during consumption of the excess electric power by the rotating electric motor, the temperature of the rotating electric motor or the temperature of the drive device exceeds their respective threshold temperature value.

In such cases, when changing a phase current supplied to the rotating electric motor from the first current value to the second current value, the controller may decrease the phase current along an equivalent torque line. Decreasing the phase current along an equivalent torque line enables electric power consumption by the rotating electric motor to be varied, while holding the shaft end torque of the rotating electric motor (the torque arising at the output shaft) constant.

Moreover, the controller may expand a running range of the rotating electric motor by stepping up the voltage of the energy storage device using the voltage transformer, and drive the rotating electric motor in the expanded running range such that current supplied to the rotating electric motor is the first current value. When the temperature of the rotating electric motor or the temperature of the drive device exceeds the threshold temperature value, the controller may lower the stepped-up voltage and contract the running range, and drive the rotating electric motor in the contracted running range such that the current supplied to the rotating electric motor is the first current value.

Due to being able to control expansion or contraction of the running range by controlling the stepped-up voltage, the phase current supplied to the rotating electric motor can be made smaller by lowering the stepped-up voltage when the temperature of the rotating electric motor or the temperature of the drive device has exceeded the threshold temperature value (namely, the operating point can be shifted such that the current is smaller). This accordingly enables control when shifting the operating point to be suppressed from becoming complicated.

When excess electric power generated by the vehicle is regeneration power arising from braking use, and the regeneration power is not all consumable in the rotating electric motor, preferably the controller sets braking force for the non-consumable portion of regeneration power to be provided by mechanical braking. Thereby, when excess electric power generated by the vehicle itself is regeneration power arising from braking use, braking force due to the regenerative power is provided by electric power consumption through power running the rotating electric motor, and any insufficiency still arising is supplemented by mechanical brakes, thereby securing braking force. Moreover, the rotating electric motor is controlled along an equivalent torque line, and so the behavior of the vehicle can be suppressed from being affected.

Moreover, the temperature of the rotating electric motor may be a temperature of a field coil configuring the rotating electric motor or a temperature of a cooling medium for cooling the rotating electric motor, and the temperature of the drive device may be a temperature of a semiconductor switching element configuring the drive device. Thereby, the temperature of the rotating electric motor or the temperature of the drive device can be simply and accurately reflected.

More specifically, the running range of the rotating electric motor may be expanded by operating under strong field control. The d-axis current is a positive value due to being strong field controlled (inefficient controlled), thereby enabling demagnetization of permanent magnets accompanying a rise in temperature of the rotating electric motor to be prevented. Even when the magnets have reached a high temperature, due to the strong field control (inefficient control), a demagnetizing field is not applied to the magnets and a magnetic field is applied in the direction of magnetization, raising the resistance to demagnetization. Moreover, in strong field control, the attraction force due to the magnetism between the magnets of the rotor and the coil of the armature is raised, enabling movement in both the rotation direction of the rotor and the axial direction of the rotor to be suppressed, and improving the NV characteristics of the rotating electric motor, and hence raising the NV characteristics of the vehicle.

The present disclosure is preferably applied to a vehicle in which the drive device is a first drive device, the load is an internal combustion engine, the rotating electric motor is a first rotating electric motor, and the vehicle further includes the following: a second rotating electric motor having a wheel as a load, and a second drive device having an alternating current side connected to the second rotating electric motor and a direct current side connected to the high voltage side of the voltage transformer. In such a configuration, excess electric power generated by the vehicle is part or all of regeneration power generated by the second rotating electric motor.

Namely, the present disclosure is preferably applied to a hybrid vehicle. The present disclosure enables intervention of mechanical braking to be suppressed to a minimum, so as to enable prolonged usage of friction members for mechanical braking. The friction members for mechanical braking can also be reduced in size if the same usage duration as normal is to be achieved.

Moreover, when the temperature of the rotating electric motor or the temperature of the drive device has exceeded the threshold temperature value during consumption of the excess electric power in the rotating electric motor, the stepped-up voltage is made smaller in the inefficient region, the running range of the rotating electric motor is contracted, and overheating of the rotating electric motor or the drive device can be prevented by reducing the electric power consumption of the rotating electric motor.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
   an energy storage;
   a motor driver configured to convert direct-current power to alternating-current power and to convert alternating-current power to direct-current power;
   an electric motor connected to the energy storage via the motor driver to move the vehicle; and
   circuitry configured to
      drive the electric motor with a first current value to consume excess electric power, the first current value being different from a minimum current value to generate regeneration power arising from a braking force, and
      drive the electric motor with a second current value smaller than the first current value if a temperature of the electric motor is higher than a first threshold temperature or a temperature of the motor driver is higher than a second threshold temperature.

2. The vehicle according to claim 1, wherein when changing a phase current supplied to the electric motor from the first current value to the second current value, the circuitry decreases the phase current along an equivalent torque line.

3. The vehicle according to claim 1, wherein the circuitry is configured to execute strong field control to drive the electric motor with the first current value or the second current value with respect to the minimum current value.

4. The vehicle according to claim 1, wherein the temperature of the electric motor is a temperature of a field coil configuring the electric motor or a temperature of a cooling medium for cooling the electric motor, and the temperature of the motor driver is a temperature of a semiconductor switching element configuring the motor driver.

5. A vehicle comprising:
   an energy storage;
   a motor driver configured to convert direct-current power to alternating-current power and to convert alternating-current power to direct-current power;
   an electric motor connected to the energy storage via the motor driver to move the vehicle; and
   circuitry configured to
      drive the electric motor with a first current value to consume excess electric power, the first current value being different from a minimum current value to generate a driving force, and
      drive the electric motor with a second current value smaller than the first current value if a temperature of the electric motor is higher than a first threshold temperature or a temperature of the motor driver is higher than a second threshold temperature.

6. The vehicle according to claim 5, wherein when changing a phase current supplied to the electric motor from the first current value to the second current value, the circuitry decreases the phase current along an equivalent torque line.

7. The vehicle according to claim 5, wherein the circuitry is configured to execute strong field control to drive the electric motor with the first current value or the second current value with respect to the minimum current value.

8. The vehicle according to claim 5, wherein the temperature of the electric motor is a temperature of a field coil configuring the electric motor or a temperature of a cooling medium for cooling the electric motor, and the temperature of the motor driver is a temperature of a semiconductor switching element configuring the motor driver.

* * * * *